Aug. 23, 1932.  I. D. FORD  1,873,370
SECURING MEANS
Original Filed Jan. 12, 1928
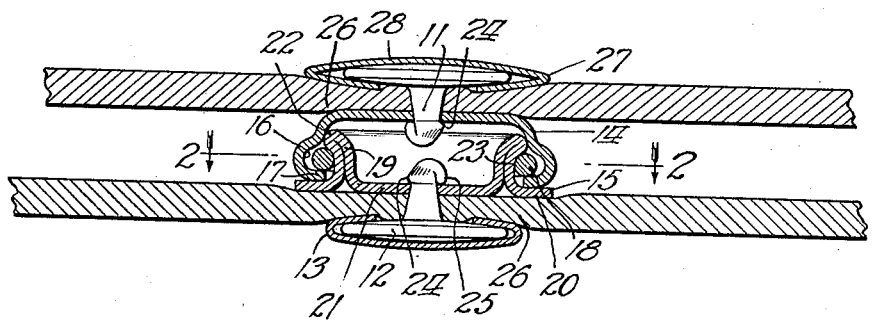
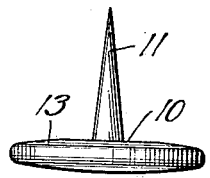
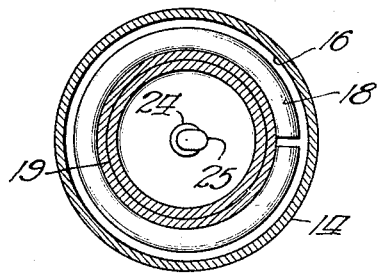
Inventor
Ira D. Ford Patented Aug. 23, 1932

1,873,370

UNITED STATES PATENT OFFICE

IRA D. FORD, OF ROSELAND, ONTARIO, CANADA, ASSIGNOR TO UNIVERSAL BUTTON FASTENING & BUTTON COMPANY, OF DETROIT, MICHIGAN, A CORPORATION OF MICHIGAN

SECURING MEANS

Application filed January 12, 1928, Serial No. 246,117. Renewed May 11, 1931.

This invention relates to snap fastener securing means and aims to provide improved means for utilizing snap fasteners for detachably securing pieces of cloth together.

The invention may be readily understood by reference to one illustrative embodiment thereof shown in the accompanying drawing, in which:

Fig. 1 is a section through the elements of a closed snap fastener holding together two overlapping pieces of fabric;

Fig. 2 is a plan section taken along the line 2—2 of Fig. 1 showing the snap ring of the socket portion of the fastener and the appearance of the upset fastener prong.

Fig. 3 is an elevation of a single prong tack fastener before the prong has been upset in the attaching operation.

Because of the facility of their application and because they require no button holes, snap fasteners are advantageous for fastening together overlapping pieces of cloth or the like, particularly in working clothing and other articles where ease in fastening or unfastening are important or where fastening by buttons or hooks is difficult or unsuitable. However, the strain which is placed on the cloth to separate snap fasteners having sufficient separation resistance for articles of clothing of this character, frequently results in tearing of the cloth at the point of attachment of the fastener, due to weaknesses created by severing of the threads of the cloth by the attaching means. Snap fasteners have, therefore, been objectionable notwithstanding their inherent advantages, except for unusually strong material such as leather.

The improved attaching means is herein represented by a headed, single pronged tack or fastener 10 whose prong 11 is sharply pointed and pierces the cloth without weakening or severing any part thereof, and is upset within the fastener part under pressure so that the cloth is clamped between the head of the tack and the base of the snap fastener part. In the present fastener the head 12 is integral with the prong 11 and is advantageously finished (and enlarged if need be) by a capy 13 whose margins are crimped or upset under the head. The tack is made of metal sufficiently ductile and malleable that it may be formed in a tack machine and so that the prong of the tack will enlarge and upset properly inside the snap fastener under the action of the upsetting die.

The snap fastener is represented herein by a socket part 14 and a stud part 15 which is received and separably held within the socket. The socket part 14 consists of a cup shaped member advantageously pressed from sheet metal and having an interior groove 16 adjacent the edge 17 of the rim of the cup or socket. Loosely held within the groove is a spring ring 18 which in this instance extends almost but not quite around the circumference of the groove. The stud part 15 comprises in this instance, a circular flange or head 19 advantageously of double thickness and projecting from a base flange 20 which is preferably integral with the circular flange for simplicity and manufacturing economy. The stud part is designed in this instance to provide a central base portion 21 in addition to the base provided by the flange 20; and thus designed may be readily formed from a single piece of sheet metal. The free edge of the stud flange 19 is advantageously upset to provide a rounded bead 22 whose internal diameter is slightly greater than the normal or unstrained internal diameter of the spring ring 18. The depth of the projecting stud 19 is such that it may enter the socket part 14 during which movement the spring ring 18 is expanded to pass over the bead 22 after which it contracts around the neck 23 or portion of the flange under the bead. The internal diameter of the groove 16 is made sufficiently larger than the normal diameter of the ring to allow room for expansion of the ring in passing over the bead 22.

The spring strength of the spring ring 18 and the shape and diameter of the bead 22 are designed to offer appropriate resistance to separation of the stud and socket parts of the fastener. Where the fastener is designed for holding together portions of a cloth garment, for example, the resistance to separation of the stud and socket must be at least great enough to withstand the tension (which is sometimes relatively large) exerted in the normal use of the garment.

The bases of the stud and socket parts, respectively, are perforated centrally or indented so that they may be readily pierced by the pointed prong of the attaching fastener. In any case, the opening in the base should not be larger than the portion of the prong which is in engagement therewith. A tight fit is preferable and this may be advantageously secured by permitting the prong of the fastener, which is tapered as shown, either to pierce the base of the fastener part or to enlarge a previously formed smaller perforation, thus making an opening which conforms exactly to the prong and engages it tightly. In attaching a fastener part, pressure is applied so as to compress the cloth between the head of the tack and the base of the fastener, and thus compressed the internally projecting prong of the fastener is upset within the fastener part. The base of the fastener part fitting closely around the prong, limits the upsetting of the prong to that portion of the prong which lies inside the fastener part. The character of the metal of which the prong is made is such that under the upsetting action of the die it slightly enlarges or expands in diameter at 24, just inside the perforation in the base of the fastener part, so that it resists separation from the fastener part throughout its circumference. The extremity of the prong is bent or curled over, as at 25, against the base of the fastener part, thus providing additional security against separation or loosening of the grip on the cloth. The tapered shape of the spring as well as the tight fit of the fastener part about the prong serves to concentrate the expansion of the prong to the region just inside the fastener base where the prong is weaker and is unconfined.

While the bases of the fastener parts may be flat, they may advantageously be made slightly concave on their exteriors to insure that the cloth will be gripped at least as firmly at the edges 26 of the gripped area as at the center around the base of the prong 11. The tension in the fastener prongs is sufficient to cause the bases of the stud and socket parts and the fastener heads tightly to grip or compress the fabric between them. In the drawing each piece of fabric is shown compressed by the gripping action of the elements of each fastener part. The degree of compression necessary to effect a sufficient grip upon the fabric obviously depends somewhat on the character and thickness of the fabric or layers of fabric to which the fastener is secured.

For purposes of decoration or advertisement the outer or top attaching fastener 27 is advantageously provided with a head larger than that necessary merely for attaching purposes. This head includes a finishing cap 28 (the margins of which are crimped underneath the tack head) which may be decorated or designed for advertising purposes, or both, by appropriate plating and embossing.

The piercing of the fabric by the prongs of the respective attaching fastener parts not only preserves the integrity of the fabric but avoids the formation of wrinkles which would be made permanent when firmly gripped between the tack head and the base of the snap fastener. Since the integrity of the fabric is preserved, there is little opportunity for the fabric to slip between the gripping head and base; and any pull of the cloth which is communicated to the base of the attaching prong is so slight that there is no danger that the prong will slit or tear the cloth.

I have discovered that the pull which can be exerted between the cloth and an attached fastener part is materially greater than that necessary to separate the stud of a fastener from its socket, thereby providing a sufficient factor of safety against tearing or slitting so that the cloth remains intact for the life of the garment.

Obviously the invention is not limited to the details of the illustrative construction, since they may be variously modified. Moreover, it is not indispensable that all features of the invention be used conjointly, since various features may be used in different combinations and sub-combinations.

Having described one embodiment of my invention, I claim:

A snap fastener stud member for separable fasteners adapted to be separably engaged by a socket member, said stud member comprising a cup-shaped element provided with a central cloth engaging base of substantial area, an upstanding circular portion constituting the inner wall of said cup-shaped element flared outwardly to a substantial degree whereby to form an enlarged head for said stud and rebent to form the outer wall of the cup-shaped element and adapted to enter a socket element, the margin of said outer wall being in the form of an outwardly extending base flange, an attaching fastener for said stud member having a head and a single, tapered, pointed prong of ductile material, said prong piercing without severing the cloth to which the stud member is applied, said central base being penetrated by the prong and closely engaging said prong, said cup-shaped element of the stud member exposing the attaching prong so that the prong may be directly engaged by a tool to upset it, said prong being upset under pressure within the cup-shaped element while said central base of the cup-shaped element and the fastener head are caused to compress the cloth to which it is attached to provide an enlargement on said prong which engages the margin of the opening in the base whereby the prong is anchored within the cup-shaped element and preserves the gripping pressure on the opposite faces of the cloth, said prong having a head of substantial area.

In testimony whereof, I have signed my name to this specification.

IRA D. FORD.

CERTIFICATE OF CORRECTION.

Patent No. 1,873,370.  August 23, 1932.

IRA D. FORD.

It is hereby certified that error appears in the printed specification of the above numbered patent requiring correction as follows: Page 1, line 49, for the misspelled word "capy" read cap; page 2, line 38, for "spring" read prong; and that the said Letters Patent should be read with these corrections therein that the same may conform to the record of the case in the Patent Office.

Signed and sealed this 1st day of November, A. D. 1932.

(Seal)

M. J. Moore,
Acting Commissioner of Patents.